E. G. SOHLBERG.
TRANSMISSION OF ELECTRIC ENERGY TO MOVABLE ELEMENTS.
APPLICATION FILED APR. 27, 1920.
1,408,838.
Patented Mar. 7, 1922.
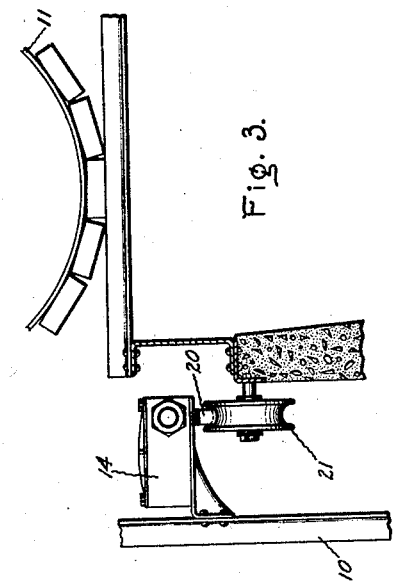
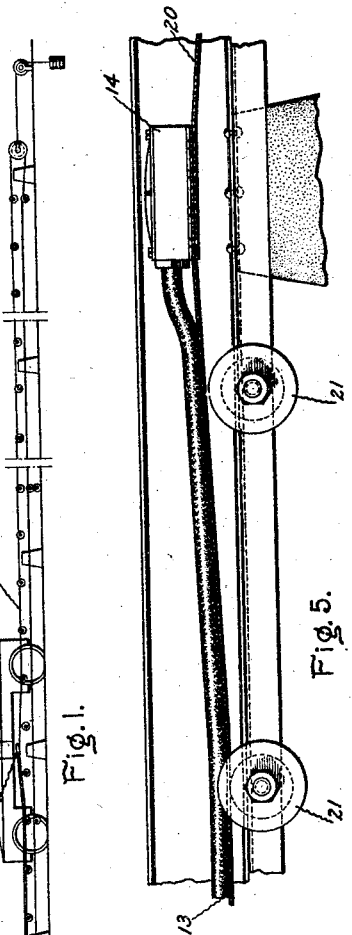
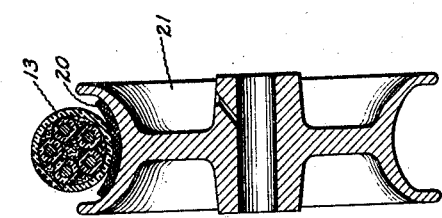
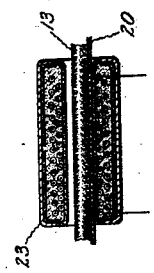
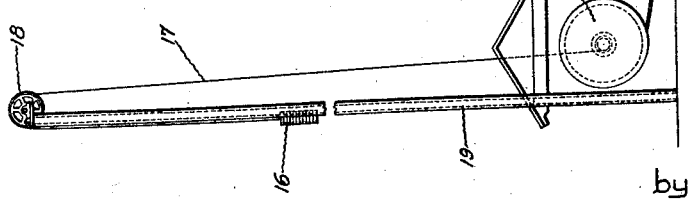
Inventor:
Erik G. Sohlberg,
by Albert G. Davis
His Attorney.

UNITED STATES PATENT OFFICE.

ERIK G. SOHLBERG, OF SCHENECTADY, NEW YORK, ASSIGNOR TO GENERAL ELECTRIC COMPANY, A CORPORATION OF NEW YORK.

TRANSMISSION OF ELECTRIC ENERGY TO MOVABLE ELEMENTS.

1,408,838.  Specification of Letters Patent.  Patented Mar. 7, 1922.

Application filed April 27, 1920. Serial No. 377,131.

*To all whom it may concern:*

Be it known that I, ERIK G. SOHLBERG, a citizen of the United States, residing at Schenectady, county of Schenectady, State of New York, have invented certain new and useful Improvements in Transmission of Electric Energy to Movable Elements, of which the following is a specification.

My invention relates to improved means for transmitting electric energy to a movable element, such for instance as the movable element of a conveyor system.

More particularly, my invention relates to improved means for conducting electric current to a movable element, carriage, or the like. One of the objects of my invention is to provide an arrangement whereby the strain on the electric cable supplying electric energy to the movable element may be reduced to a minimum, and whereby the wear and strain on the cable due to the friction caused by moving the element back and forth may be practically eliminated.

Although my invention is useful in conveyor systems, it will be apparent to those skilled in the art that its use is not limited thereto. In conveyor systems provided with a carriage or element movable back and forth between certain limits of travel, difficulties are experienced in conducting the electric current to the carriage, particularly where the path of travel of the carriage is a considerable distance. In carrying my invention into effect in one form, I secure one end of the electric cable for conducting current to the movable element or carriage, and also provide a support for the cable which is movable with the carriage and extended or shortened as the carriage is moved, so that the cable may be laid on the support as the carriage is moved along its path of travel. There is thus comparatively no relative movement between the support and the cable, and friction is thereby practically eliminated, thus reducing the wear on the cable. In one form of my invention I provide a support for the cable which may take the form of an endless belt suitably reeved at both ends of the path of travel and fastened to the carriage, or the support may be otherwise arranged so as to be extended as the carriage is moved forward and shortened as the carriage is returned. Suitable takeup means are provided for maintaining a tension on the cable. In order to dry the cable or to prevent the insulation of the electric cable from being torn or otherwise injured due to the formation of ice between the cable and its support, I provide a heating device located so as to heat the cable and support at their point of separation.

For a better understanding of my invention, reference is had to the accompanying drawings in which my invention is embodied in a particular arrangement for purposes of illustration, and in which Fig. 1 is a simplified diagram showing the manner in which the electric cable is laid on the movable support; Fig. 2 is a section of one of the idler pulleys which support both the electric cable and the supporting belt on which the electric cable is laid; Fig. 3 is a fragmentary sectional view of Fig. 1 for the purpose of showing the manner in which the electric cable and its supporting belt are supported by the idlers along the path of travel of the carriage; Fig. 4 is a fragmentary view showing an electric heating device for drying the cable or for thawing the ice formed between the cable and its supporting belt; and Fig. 5 is a detail of Fig. 1 drawn to an enlarged scale for the purpose of showing the manner in which the electric cable is laid on the endless supporting belt.

Referring to the drawings, the movable element or carriage 10 is movable back and forth upon tracks along a definite path of travel. The movable element may be provided for any suitable purpose, as for instance the control of the endless belt 11 of a conveyor system. Electrical energy is supplied to the carriage for any suitable purpose, such for instance as propelling the carriage back and forth along its path of travel or for the control of electrical apparatus remote from the carriage. Electrical energy is supplied from any suitable source to the carriage through an electric cable 13. The electric cable has one end secured to the carriage at 14. This may take the form of a junction box as indicated in Fig. 5. The other end of the cable is connected with a source of electrical supply (not shown) and is wound upon a reel 15. This reel is counterweighted by means of a weight 16 secured to a rope 17 which passes over a pulley 18 mounted on a support 19, or any other suitable means may be provided for taking up the slack in the electric cable. If the electric cable were dragged along the path of travel as the carriage moves, the cable would be put under considerable strain and the friction produced would cause the insulation of the cable to be quickly worn through. These cables are ordinarily very expensive, and my invention provides improved means whereby the wear and strain on the cable due to the movement of the carriage may be practically eliminated. To that end the electric cable is laid upon a support which moves with the carriage and which in the form shown in the drawings comprises the belt 20 of any suitable material. This belt has both ends secured to the junction box 14, as shown in Fig. 5, or it is otherwise suitably secured to the carriage. The belt is supported so as to be freely movable with the carriage by means of idler pulleys 21 located along the path of travel of the carriage, and the belt is suitably reeved at both ends so that a movement of the carriage causes the belt to be moved with the carriage. A suitable take-up device 22 is provided for maintaining a certain tension on the belt. At the one end of the path of travel where the electric cable and the supporting belt separate as the carriage moves toward the left, there is provided a heating device 23 comprising an electric heating element supplied with energy from any suitable source, or any other suitable heating device may be provided. The heating device is provided for melting any ice which may form between the electric cable and the belt 20, so that the insulattion will not be torn from the electric cable as the electric cable is wound upon the reel 15, or for drying the cable before it is wound upon the reel.

As thus constructed and arranged, the operation of my invention is as follows: Assume that the carriage 10 is moved toward the right. The cable 13 will be drawn along with the carriage and will be laid upon the supporting belt 20. There will be no relative movement between the cable and the supporting belt after the cable is once laid thereon, the belt taking up the wear and strain due to the movement of the carriage. The effective supporting portion of the belt will be extended as the carriage is moved and the belt thus forms a continuous extensible support for the cable along the path of travel. In case the carriage is moved toward the left, the electric cable 13 will be wound upon the reel 15 by reason of the applied tension, and the support for the cable will move with the carriage, so that the only relative movement between the support and the electric cable will be at their point of separation. In order to minimize the wear and strain on the supporting belt 20, the belt and cable are supported by idlers 21 located along the path of travel of the carriage. In case ice has formed between the electric cable and the supporting track, or these parts are wet, the heating device 23 located at the point of separation of the electric cable and the supporting belt will be energized to melt the ice or dry the cable.

What I claim as new and desire to secure by Letters Patent of the United States, is,—

1. The combination with a movable element and a cable secured to the same for conducting electric energy thereto, of means extensible with the movement of the element on which the cable is laid to relieve the cable of wear due to the movement of the element.

2. The combination with a movable element and a cable secured to the same for conducting electric energy thereto, of a support for the cable secured to the element and arranged to be extended along the path of travel of the element as the element is moved to provide a continuous support upon which the cable is laid to relieve the cable of wear due to the movement of the element.

3. The combination with a movable element and a cable having one end secured to the same for conducting electric energy thereto, of a supporting belt movable with the element to provide a continuous support on which the cable is laid to relieve the cable of wear and strain due to the movement of the element.

4. The combination with a movable element and a cable having one end secured to the same for conducting electric energy thereto, of a support on which the cable is laid, the said support being secured to the element so as to be movable therewith and arranged to be extended or shortened as the element is moved.

5. The combination with a movable element and a cable having one end secured to the same for conducting electric energy thereto of means for maintaining a tension on the cable, and an extensible support movable with the element on which the cable is laid.

6. The combination with a movable element and a cable having one end secured to the same for conducting electric energy thereto, of a supporting belt on which the cable is laid, the effective supporting portion of said belt being extended as the element is moved in one direction and shortened as the element is returned, and idler pulleys along the path of travel of the element for supporting the belt and cable.

7. The combination with a movable element and a cable having one end secured to the same for conducting electric energy thereto, of an extensible support movable with the element on which the cable is laid, and a heating device located at the point where the cable and support separate.

8. The combination with a reciprocable element and a cable having one end secured to the element for conducting electric energy thereto, of a reel mounted at one end of the path of travel of the element on which the cable is wound, and an endless belt extending along the path of travel of the element, the said belt being secured to the element and movable therewith to provide an extensible continuous support on which the cable is laid.

In witness whereof, I have hereunto set my hand this 26th day of April, 1920.

ERIK G. SOHLBERG.